United States Patent

Richards

[11] Patent Number: 4,546,477
[45] Date of Patent: Oct. 8, 1985

[54] PULSE TRANSMISSION OR REFLECTION MODE LASER

[75] Inventor: James Richards, Adelaide, Australia

[73] Assignee: The Commonwealth of Australia, Canberra, Australia

[21] Appl. No.: 573,914

[22] PCT Filed: Apr. 13, 1983

[86] PCT No.: PCT/AU83/00043
§ 371 Date: Dec. 21, 1983
§ 102(e) Date: Dec. 21, 1983

[87] PCT Pub. No.: WO83/03926
PCT Pub. Date: Nov. 10, 1983

[30] Foreign Application Priority Data

Apr. 23, 1982 [AU] Australia ............... PF3729

[51] Int. Cl.⁴ ........................... H01S 3/11
[52] U.S. Cl. ........................ 372/12; 372/93; 372/98
[58] Field of Search ............ 372/12, 13, 9, 106, 372/105, 10, 93

[56] References Cited

U.S. PATENT DOCUMENTS

| | | | |
|---|---|---|---|
| 3,719,414 | 3/1973 | Wentz | 372/12 |
| 3,914,710 | 10/1975 | Young | 372/12 |
| 4,331,387 | 5/1982 | Wentz | 372/12 |
| 4,408,334 | 10/1983 | Lundstrom | 372/105 |
| 4,441,186 | 4/1984 | Erickson | 372/12 |

OTHER PUBLICATIONS

Ernest et al., "Giant Optical Pulse Shortening Through Pulse-Transmission Mode Operation of a Pulse Laser"; *Phys. Lett.*, vol. 22, No. 2, Aug. 1, 1966.

Primary Examiner—William L. Sikes
Assistant Examiner—Léon Scott, Jr.
Attorney, Agent, or Firm—Cushman, Darby & Cushman

[57] ABSTRACT

A Q-switched laser in which the laser cavity contains on one side of the laser rod (1) a mirror (2) and on the other side of the laser rod (1) in sequence a polarizer (4) and an electro-optical cell (5) and first fold-back reflector means (3) to fold-back the beam to a second reflector (6) arranged to direct the beam back to the polarizer (4) to form a loop around the electro-optical cell (5). The mirror (2) is a partial reflector to allow output from the laser rod (1) through the mirror in pulse reflection mode or is a total reflector to allow output from the polarizer (4) in pulse transmission mode.

6 Claims, 3 Drawing Figures

PULSE TRANSMISSION OR REFLECTION MODE LASER

This invention relates to a pulse transmission mode laser that may also be used in a pulse reflection mode.

The output from conventional Q-switched lasers drops when induced birefringence is present in the laser rod. Briefly the reason for this is that conventional lasers contain a polariser that rejects any radiation not correctly polarised, hence the depolarisation that occurs due to birefringence leads to lost energy and poor efficiency. The birefringence could have several sources, a common one is due to thermal stresses as occurs, for example in high repetition rate lasers. Another source is due to imperfectly grown laser rods as commonly occurs, for example, in calcium tungstate.

Techniques exist for maintaining efficiency when birefringence is present but these have some deficiencies. For example the method of Scott and De Wit employs two separate laser rod-flashlamp assemblies and is quite complex. The crossed porro laser, as described for instance in the Specification of Australian Pat. No. 466,196, (British Pat. No. 1,358,023) Ferranti Limited or the Specification of U.S. Pat. No. 3,924,201, International Laser Systems, is simpler but the outcoupling available is restricted to near 50% which may not be suitable for lasers generating very high or very low peak powers. One method of eliminating the effects of birefringence is to generate an unpolarised beam. Electro-optic devices able to switch unpolarised radiation have been fabricated but these are not readily available.

The object of this invention is to provide a laser geometry able to generate unpolarised, Q-switched radiation using commonly available electro-optic Pockels cells.

The invention generally comprises a laser operating either on the pulse transmission mode or the pulse reflection mode and comprises a laser cavity containing on one side of the laser rod a mirror and on the other side, in sequence, a polariser and electro-optical cell and first fold-back reflector means and through a second reflector to the polariser to form a loop around the optical cell. The mirror can be a partial mirror to allow output from the cavity through the mirror in pulse reflection mode, or it can be a total mirror in which case the output can be arranged to be from the polariser in pulse transmission mode.

The loop so formed is thus independent of the laser rod, energy rejected out the side of the polariser is directed back into it via the loop around the electro-optical cell.

To enable the invention to be readily understood, the following description will be made with reference to the accompanying drawings in which.

Figure 1:
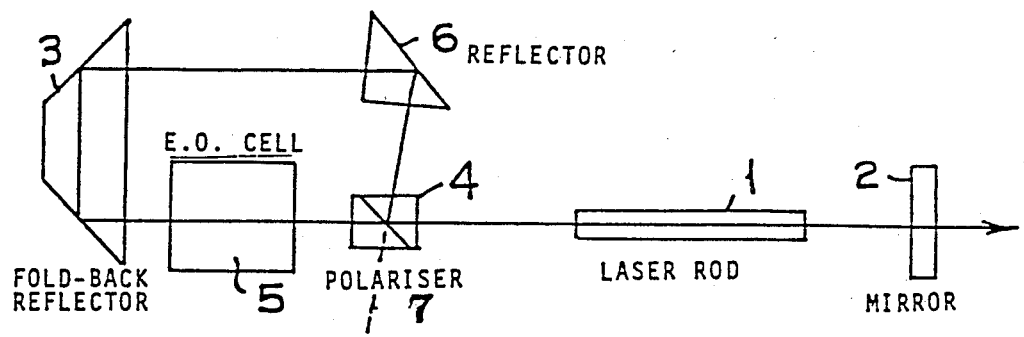
FIG. 1 shows a typical laser assembly embodying the invention, using a partially reflecting mirror to allow output through the mirror. If the mirror is totally reflecting the output is from the polariser as shown by the dotted arrow.

Referring first to FIG. 1, the laser rod 1 is positioned in the laser cavity which is defined between the partially transmitting mirror 2 and the fold-back reflector 3, in this case a double reflecting prism, the cavity including, between the laser rod 1 and the fold-back reflector 3, the polariser 4 and the electro-optical cell 5.

The fold-back reflector 3 passes radiation back outside of the electro-optical cell to be reflected by a second reflector 6, in this case a prism, back to the polariser 4.

The laser operates by redirecting any energy rejected out the side of the polariser 4 back into the polariser via the loop composed of the two totally internal reflectors 3 and 6. Similarly energy passing through the polariser 4 is returned to it by the loop, although in this case the energy circulates in the opposite direction. Of course, as illustrated in the Figures and as would be inherently known to those skilled in the art, reflectors 3 and 6 must be positioned with respect to polariser 4 to cause the two counter-rotating beams to travel along substantially the same paths.

Figure 2:
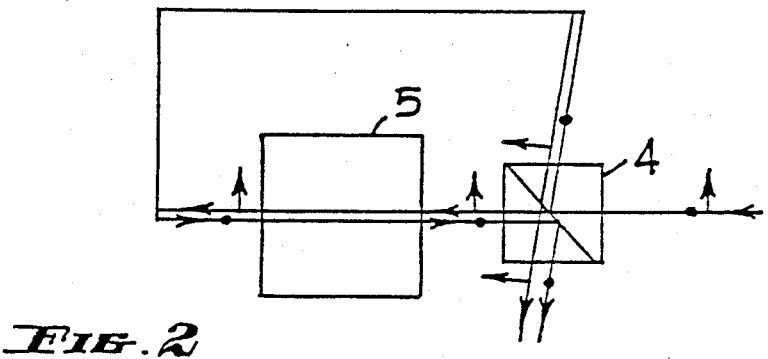
FIG. 2 shows the ray paths through the polariser and the electro-optical cell when there is no phase shift in the electro-optical cell.
Figure 3:
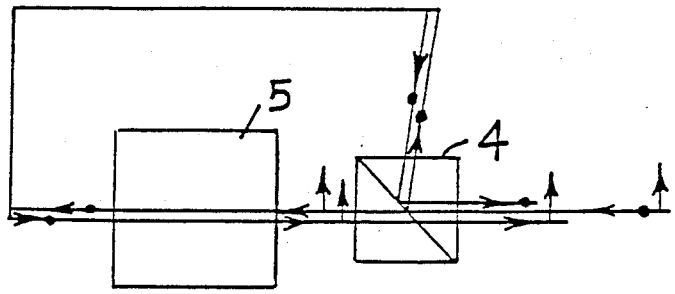
FIG. 3 shows the ray paths when a $\lambda/2$ phase shift occurs in the electro-optical cell.

In order to achieve high losses in the cavity so as to allow inversion to build up, the electro-optical cell 5 is adjusted to give zero phase shift. In this case energy cannot return to the laser rod as is shown in FIG. 2. The Q-switched output is then achieved by rapidly applying a half wave voltage to the electro-optical cell. This effectively rotates the plane of polarisation of radiation passing through the cell by 90 degrees and results in the return of all energy to the laser rod, as shown in FIG. 3. The important feature of this switching action is that it operates irrespective of the polarisation state of radiation coming from the laser rod, hence an unpolarised radiation field will build up in the laser rod.

Laser output can be achieved in either of two ways. The most straightforward uses the pulse reflection mode employing a partially transmitting mirror 2 as shown. This is a versatile method allowing a full range of outcoupling coefficients.

The other method uses the pulse transmission mode (PTM) technique. In this technique a total reflecting mirror 2 is used and, at the instant the power level inside the cavity is at its peak, the half wave voltage applied to the electro-optical cell 5 is removed. This causes the energy inside the cavity to be dumped out the fourth side of the polariser in the direction 7 shown by the dotted arrow in FIG. 1. The main advantage of using this method of extracting energy from the laser is that it produces output pulse widths approaching the round trip time in the cavity, and thus considerably shorter than normal Q-switched pulses. The output will again be unpolarised and thus will allow efficient operation at high repetition rates, a feature other PTM techniques cannot match.

The components used in the laser are quite common. Some care in the selection of the polariser must be made because the extinction ratio, E, of the laser is given by:

$$E = \frac{1}{R_{perp}T_{perp} + R_{par}T_{par}}$$

where R, T refer to reflection and transmission coefficients and the subscripts 'perp' and 'par' refer to polarization directions either perpendicular or parallel to the plane of incidence. The above relationship shows that the leakage of both polarisations i.e. represented by the terms $R_{perp}$ and $T_{perp}$, are significant factors, whereas in common systems only $T_{perp}$ is significant. Thus some polarisers suitable for conventional operation may not suit this application.

In FIG. 1 reflectors 3 and 6 are shown as the 100% reflecting components forming the loop. Equally, 100% reflecting dielectric mirror means could be used, although the need to operate them off normal incidence makes them non-standard components.

I claim:

1. A Q-switched laser comprising:
   a laser rod;
   a mirror in optical alignment with and disposed on one side of said laser rod and an optical loop including:
   a polarizer in optical alignment with and disposed on another side of said laser rod opposite said mirror;
   an electro-optical cell disposed to pass light from and to said laser rod transmitted through said polarizer;
   fold-back reflector means for folding back light from and to said electro-optical cell; and
   a reflector disposed to reflect light from said fold-back reflector means to said polarizer along a different axis than that of light passing between said polarizer and said electro-optical cell, and to reflect said light from said polarizer to said fold-back reflector means; said polarizer, said fold-back reflector means and said reflector being disposed to cause light to form said loop around said electro-optical cell such that light of a first polarization travels around said loop in a first direction and light of a second polarization travels around said loop in a second direction opposite said first direction; light of both said first and second polarizations building up in said loop when said electro-optical cell has a predetermined potential state.

2. A laser according to claim 1 wherein said mirror is totally reflecting in a pulse transmission mode and the voltage of said electro-optical cell prevents light output when said electro-optical cell is in said predetermined potential state, and causes light of both said first and second polarisations to be output through said polarizer when said electro-optical cell is in another potential state different from said predetermined potential state.

3. A laser according to claim 2 wherein said cell voltage is removable at peak power to cause said output through a side of said polariser opposite said reflector.

4. A laser according to claim 1 wherein said mirror is partially reflective in a pulse reflection mode to allow light output from said laser rod through said mirror when said electro-optical cell is in said predetermined potential state.

5. A Q-switched laser according to claim 1 wherein at least one of said fold back reflector means and said reflector is a prism.

6. A Q-switched laser according to claim 1 wherein one of said fold-back reflector means and said reflector is a dielectric mirror.

* * * * *